(12) United States Patent
Osuki

(10) Patent No.: US 11,811,993 B2
(45) Date of Patent: Nov. 7, 2023

(54) IMAGE PROCESSING APPARATUS, METHOD OF CONTROLLING IMAGE PROCESSING APPARATUS, AND STORAGE MEDIUM

(71) Applicant: CANON KABUSHIKI KAISHA, Tokyo (JP)

(72) Inventor: Takashi Osuki, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/045,041

(22) Filed: Oct. 7, 2022

(65) Prior Publication Data

US 2023/0116668 A1  Apr. 13, 2023

(30) Foreign Application Priority Data

Oct. 11, 2021 (JP) ................. 2021-166727

(51) Int. Cl.
  *G06F 3/12* (2006.01)
  *H04N 1/00* (2006.01)
(52) U.S. Cl.
  CPC ..... *H04N 1/00811* (2013.01); *H04N 1/00824* (2013.01)
(58) Field of Classification Search
  CPC ................. H04N 1/00811; H04N 1/0082
  See application file for complete search history.

(56) References Cited

U.S. PATENT DOCUMENTS

2007/0002392 A1* 1/2007 Ogura ................ H04N 1/00514
                                                          358/448
2012/0226773 A1* 9/2012 Tsuda ................. H04N 1/00244
                                                          709/217

FOREIGN PATENT DOCUMENTS

JP          2003150782 A       5/2003

* cited by examiner

*Primary Examiner* — Moustapha Diaby
(74) *Attorney, Agent, or Firm* — Canon U.S.A., Inc. IP Division

(57) ABSTRACT

Provided is a system configured to read an original document and submit the generated image data to the education management system, easily. A method of controlling an image processing apparatus includes reading an original document, specifying an assignment, receiving, from a first server, storage location information indicating a storage location in a second server corresponding to the specified assignment, transmitting image data generated by reading of the original document to the storage location indicated based on the received storage location information, and notifying the first server of identification information for identifying the image data.

19 Claims, 23 Drawing Sheets

FIG.4

| ASSIGNMENT SUBMISSION: EDUCATION SYSTEM LOGIN | |
|---|---|
| USER ID | : ATaro@ABCDeliver.co.jp ~401 |
| PASSWORD | : ●●●●●●●● ~402 |
| | LOGIN ~404 |

FIG.10

| ASSIGNMENT SUBMISSION |
|---|
| READING |

FIG.11

ASSIGNMENT SUBMISSION

SUBMITTING

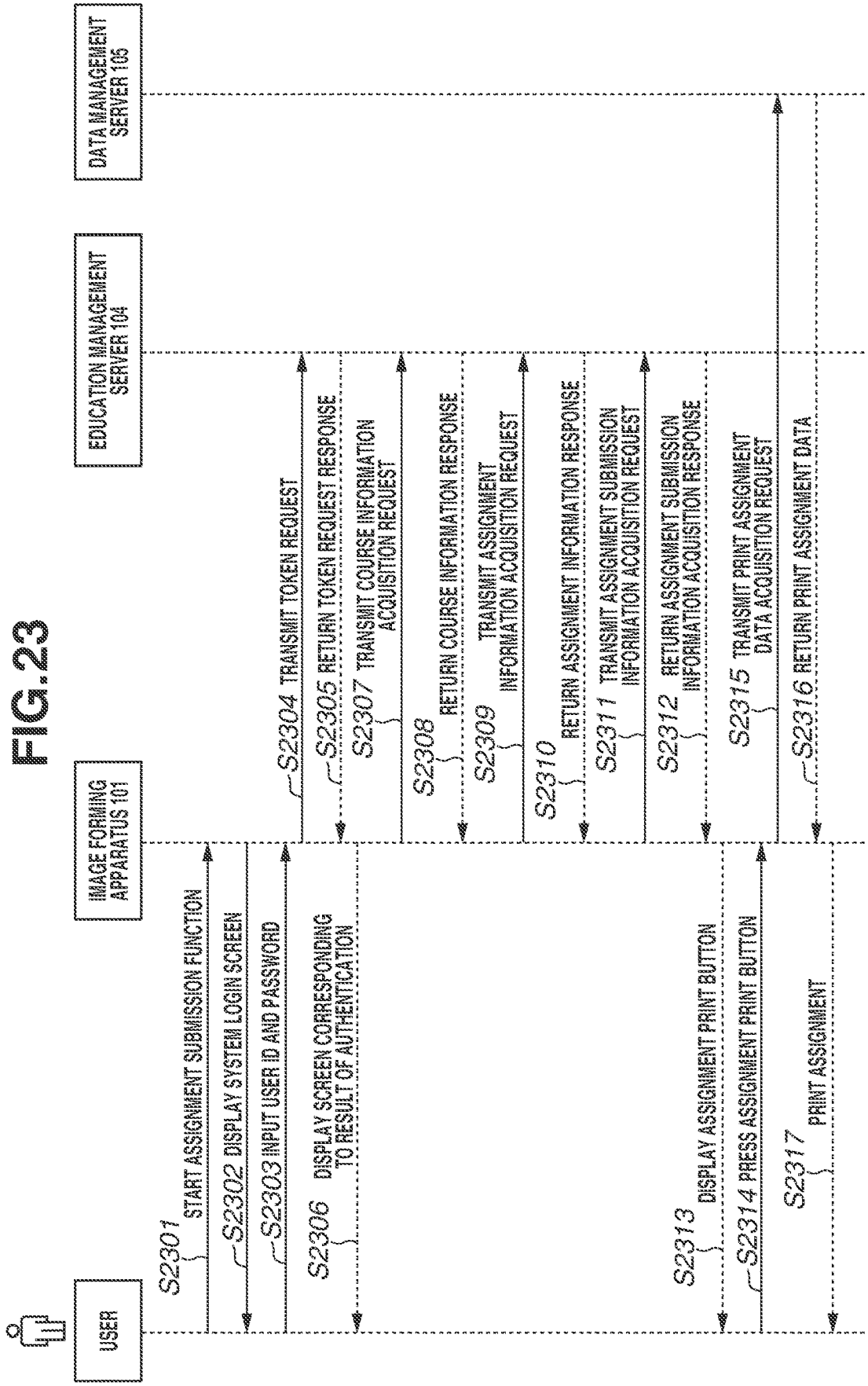

IMAGE PROCESSING APPARATUS, METHOD OF CONTROLLING IMAGE PROCESSING APPARATUS, AND STORAGE MEDIUM

BACKGROUND

Field of the Disclosure

The present disclosure relates to an image processing apparatus, a method of controlling the image processing apparatus, and a storage medium.

Description of the Related Art

Conventionally, there has been known a method in which a scanner reads a paper document created by a student to generate image data, the generated image data is transmitted to a personal computer (PC), and the image data is uploaded from the PC to an education management system, so that the document is submitted.

Such an education management system makes it possible to submit a written paper assignment without mailing the assignment. In addition, a grader of the assignment can perform grading and give feedback on the submitted document on the education management system.

Japanese Patent Application Laid-Open No. 2003-150782 discusses a method of updating a progress status corresponding to the type of collected documents.

In the conventional method, a user is required to transmit image data obtained by reading an image on a scanner to a PC once, and upload the image data to a data management server by operating the PC. In particular, in the education management system, an education management server that manages a submission situation and the like and a data management server that stores submitted image data may be separately provided. In such a case, the education management server needs to be capable of identifying image data stored in the data management server for each assignment so that a grader can later refer to a submitted document for an assignment from the education management server.

In Japanese Patent Application Laid-Open No. 2003-150782, a document image obtained by reading a document on a scanner is transmitted to a computer apparatus once, and a user is required to operate the computer apparatus to submit the document image.

SUMMARY

According to an aspect of the present disclosure, an image processing apparatus includes a reading unit configured to read an original document, a specifying unit configured to specify an assignment, a receiving unit configured to receive, from a first server, storage location information indicating a storage location in a second server corresponding to the assignment specified by the specifying unit, a transmitting unit configured to transmit image data generated by reading of the original document by the reading unit to the storage location indicated based on the storage location information received by the receiving unit, and a notifying unit configured to notify the first server of identification information for identifying the image data.

Further features of the present disclosure will become apparent from the following description of exemplary embodiments with reference to the attached drawings.

BRIEF DESCRIPTION OF THE DRAWINGS

FIG. 4 is a diagram illustrating a login screen of an education management system.

FIG. 10 is a diagram illustrating an example of a screen to be displayed during reading of an original document.

FIG. 11 is a diagram illustrating an example of a screen to be displayed during processing for submission to the education management system.

FIG. 23 is a diagram illustrating a sequence at the time when an assignment print button is pressed.

DESCRIPTION OF THE EMBODIMENTS

Exemplary embodiments of the present disclosure will be described in detail below with reference to the drawings.

The following exemplary embodiments are not intended to limit the disclosure set forth in the claims, and not all combinations of features described in the exemplary embodiments are necessarily indispensable to the solving means of the disclosure.

An exemplary embodiment of the present disclosure will be described.

Figure 1:
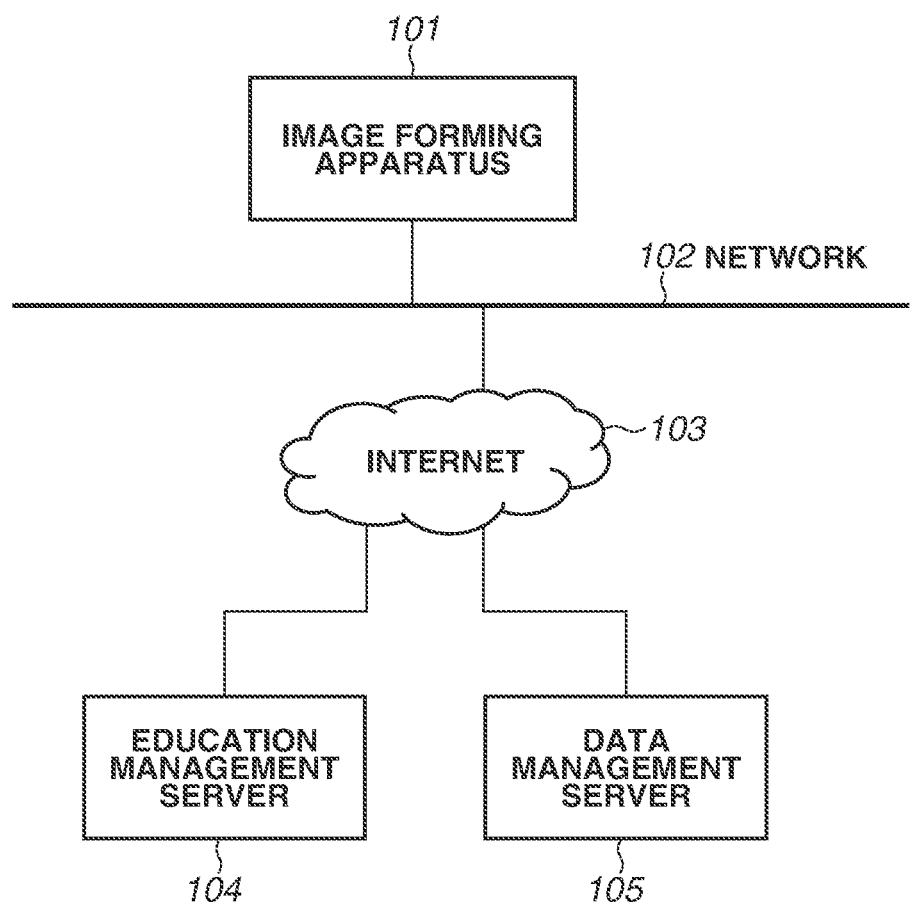
FIG. 1 is a diagram illustrating a configuration of a system including an image processing apparatus according to one or more aspects of the present disclosure.

FIG. 1 is a diagram illustrating a configuration of a system including an image forming apparatus 101 that is an example of an image processing apparatus in the present disclosure.

In the system according to the present exemplary embodiment, the image forming apparatus 101, an education management server 104, and a data management server 105 can communicate with each other via a network 102 and an Internet 103.

The image forming apparatus 101 has functions of reading an original document using a scanner, generating image data by reading the original document, and transmitting the generated image data.

The education management server 104 is a server that manages student information and assignments.

The data management server 105 is a server that stores image data and other data.

The data management server 105 and the education management server 104 combined will be referred to as an education management system.

The image forming apparatus 101 generates image data by optically scanning an image of a paper original document, and transmits the generated image data to the data management server 105 via the network 102 and the Internet 103. The network 102 is not limited to a wired network, and may be a wireless network if the network can transmit image data.

The image data to be transmitted is not limited to bitmap data, and may be data (a file) converted into a predetermined image format such as Tagged Image File Format (TIFF) or Joint Photographic Experts Group (JPEG), or data (a file) in the Portable Document File (PDF) format.

Figure 2:
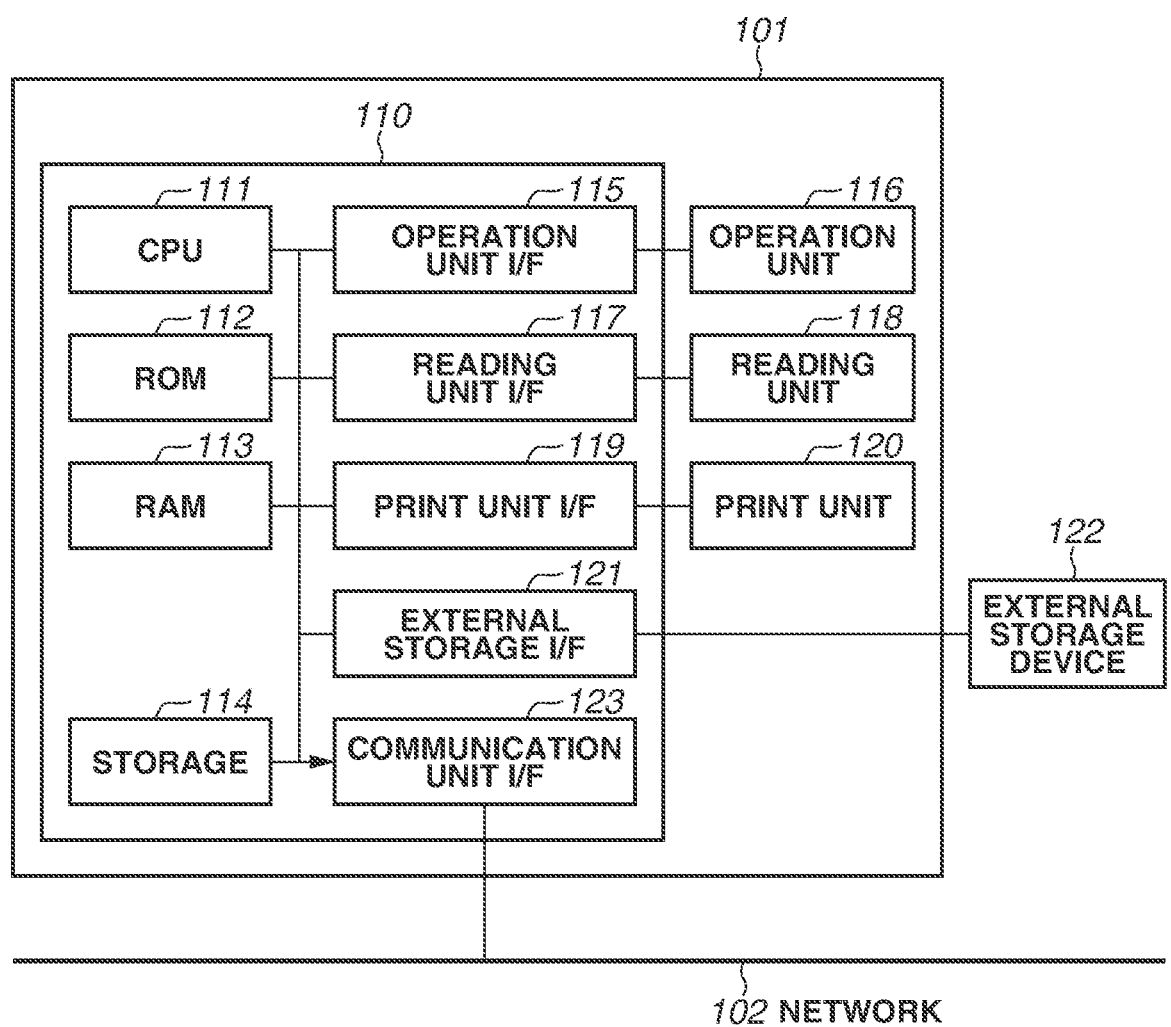
FIG. 2 is a diagram illustrating a configuration of an image forming apparatus.

FIG. 2 is a block diagram illustrating a configuration of the image forming apparatus 101.

A control unit 110 includes a central processing unit (CPU) 111, and controls operation of the entire image forming apparatus 101.

The CPU 111 reads a control program stored in a read only memory (ROM) 112 or a storage 114, thereby performing each of various types of control such as read control, print control, display control, and communication control.

The ROM 112 stores control programs that can be executed by the CPU 111. The ROM 112 also stores a boot program, font data, and the like.

A random access memory (RAM) 113 is a main memory of the CPU 111, and is used as a work area as well as a temporary storage area where various control programs stored in the ROM 112 and the storage 114 are loaded.

The storage 114 stores image data, an address book, shortcuts, various programs, and various kinds of setup information. In the present exemplary embodiment, a flash memory is used as the storage 114, but a solid state drive (SSD), a hard disk drive (HDD), an embedded MultiMedia-Card (eMMC), or the like may be used.

In the image forming apparatus 101, one CPU (the CPU 111) executes each process in flowcharts to be described below, using one memory (the RAM 113), but other mode may be adopted. For example, a plurality of CPUs, RAMs, ROMs, and storages may operate together to execute each process in the flowcharts to be described below. Further, some of processes may be executed using a hardware circuit such as an application specific integrated circuit (ASIC) or a field programmable gate array (FPGA).

An operation unit interface (I/F) 115 connects an operation unit 116 and the control unit 110.

The operation unit 116 displays an operation screen and various kinds of information to a user, and detects an operation performed by the user. For example, the operation unit 116 includes a touch panel and a hardware key. The touch panel includes a display that functions as a display portion and a touch panel sheet that functions as an operation portion. The display is used to display an operation screen and various kinds of information. The touch panel sheet and the hardware key are used to accept an operation performed by the user.

A reading unit I/F 117 connects a reading unit 118 and the control unit 110. The reading unit 118 is a scanner. The reading unit 118 reads an image of an original document and generates image data by converting the image into binary data. The image data generated by the reading unit 118 is transmitted to an external apparatus or stored in an external recording apparatus.

A print unit I/F 119 connects a print unit 120 and the control unit 110. The CPU 111 transfers image data that is a print target to the print unit 120 via the print unit I/F 119. The print unit 120 prints an image using toner supplied from a cartridge on a sheet such as a recording sheet fed from a sheet feeding cassette. The print unit 120 is a print engine. The print unit 120 can print an image based on image data generated by the reading unit 118 and can also print an image based on image data received via the network 102.

An external storage I/F 121 connects an external storage device 122 and the control unit 110. The CPU 111 stores image data in the external storage device 122 via the external storage I/F 121. In the present exemplary embodiment, a Universal Serial Bus (USB) interface is used as the external storage I/F 121, and a USB memory is used as the external storage device 122. However, the present disclosure is not limited thereto, and the external storage device 122 may be a Secure Digital (SD) card.

The control unit 110 is connected to the network 102 by a communication unit I/F 123.

The communication unit I/F 123 connects to the data management server 105 via the network 102 and the Internet 103, and performs authentication, transmission and reception of image data, and acquisition of data management information. Further, the communication unit I/F 123 connects to the education management server 104 via the network 102 and the Internet 103, and performs authentication, as well as transmission and reception of various data.

Figure 3:
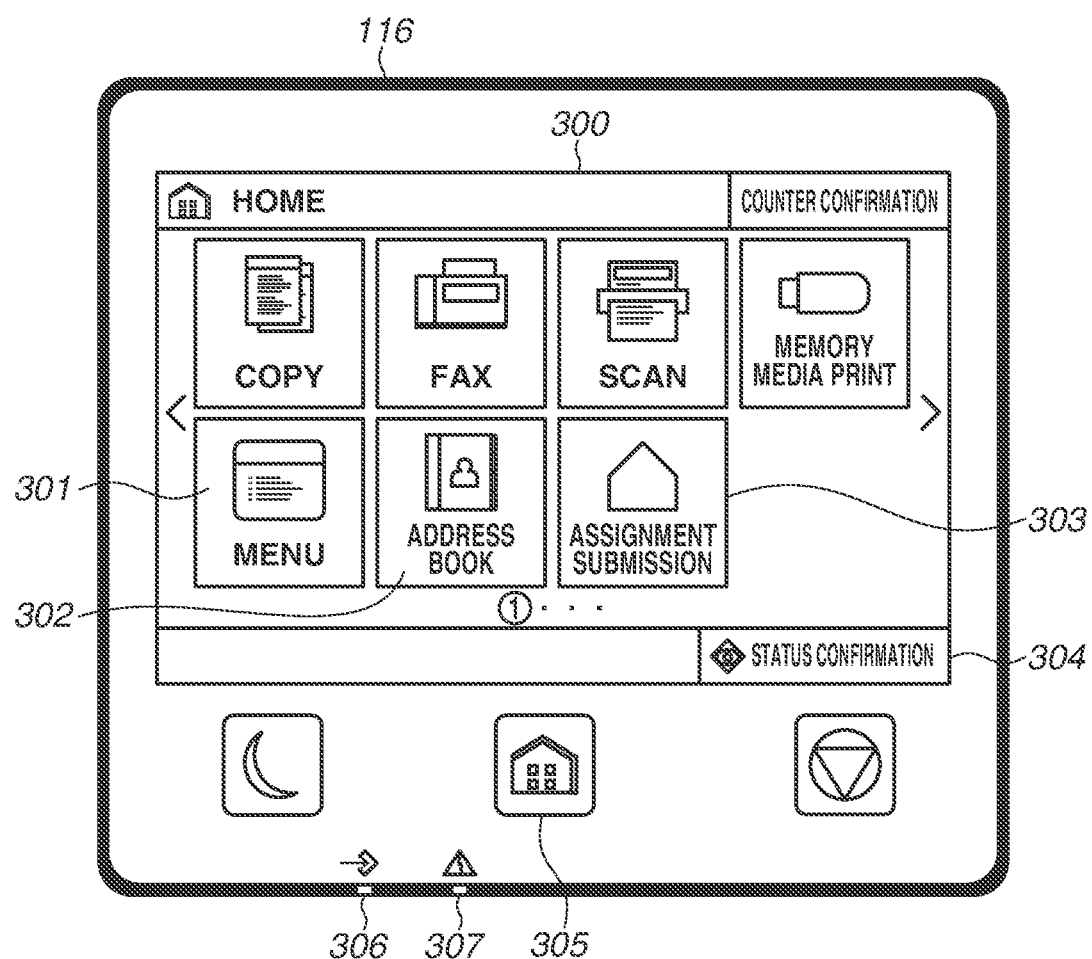
FIG. 3 is a diagram illustrating an operation unit of the image forming apparatus.

FIG. 3 is a diagram illustrating the operation unit 116. The operation unit 116 includes a touch panel 300, a hardware key 305, a data light emitting diode (LED) 306, and an error LED 307.

In FIG. 3, a home screen is displayed. The home screen is a screen for the user to select each function of the image forming apparatus 101. In the example in FIG. 3, buttons for functions to be executed by the image forming apparatus 101, such as copy, fax, scan, menu, and address book, are displayed on the home screen.

In addition, in the example in FIG. 3, an assignment submission button 303 for the user to start an assignment submission function of submitting an assignment to the education management system is displayed.

The hardware key 305 is provided to return a displayed screen other than the home screen to the home screen.

The data LED 306 and the error LED 307 each notify the user of a state of the image forming apparatus 101. The data LED 306 is turned on during job execution by the image forming apparatus 101, and the error LED 307 is turned on when some kind of error has occurred in the image forming apparatus 101.

FIG. 4 illustrates an example of a screen to be used by the user to access the education management server 104 to use the assignment submission function. The screen is displayed on the touch panel of the operation unit 116. In the screen in FIG. 4, the user inputs a user identification (ID) 401 and a password 402 registered beforehand to use the education management server 104. The input user ID 401 and password 402 are stored in the RAM 113. In the screen in FIG. 4, the input user ID 401 is displayed, and bullets are displayed in place of the input password 402.

Figure 5:
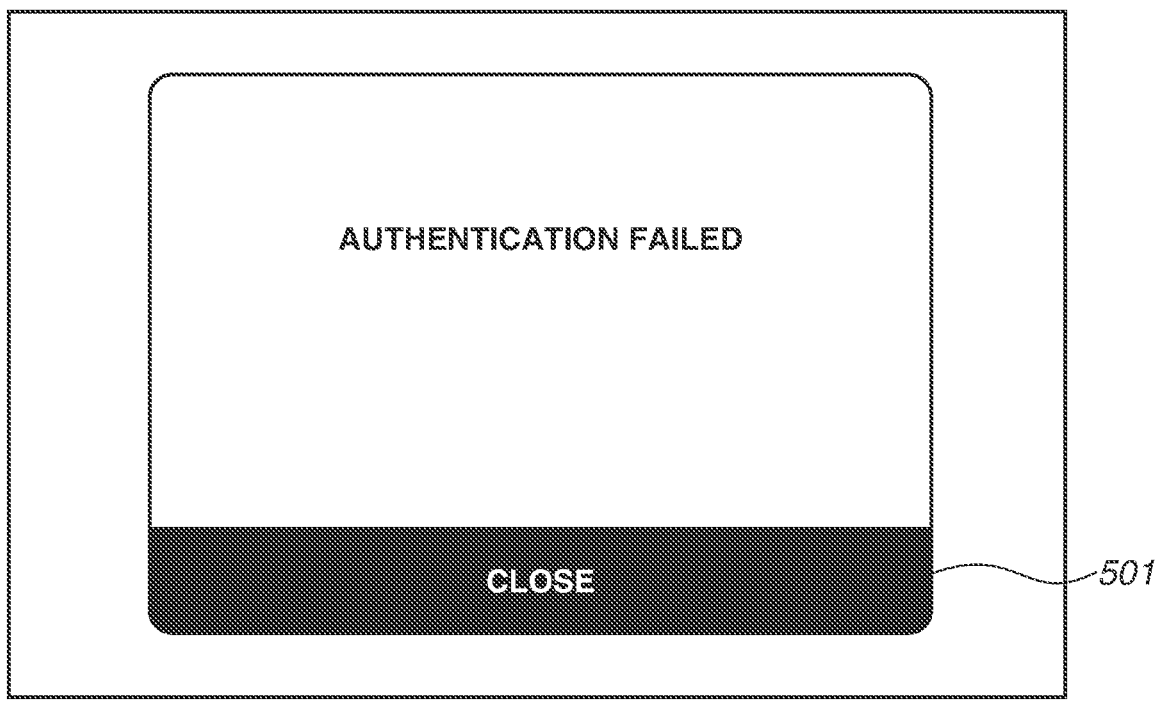
FIG. 5 is a diagram illustrating a screen to be displayed when a login fails in the education management system.
Figure 13:
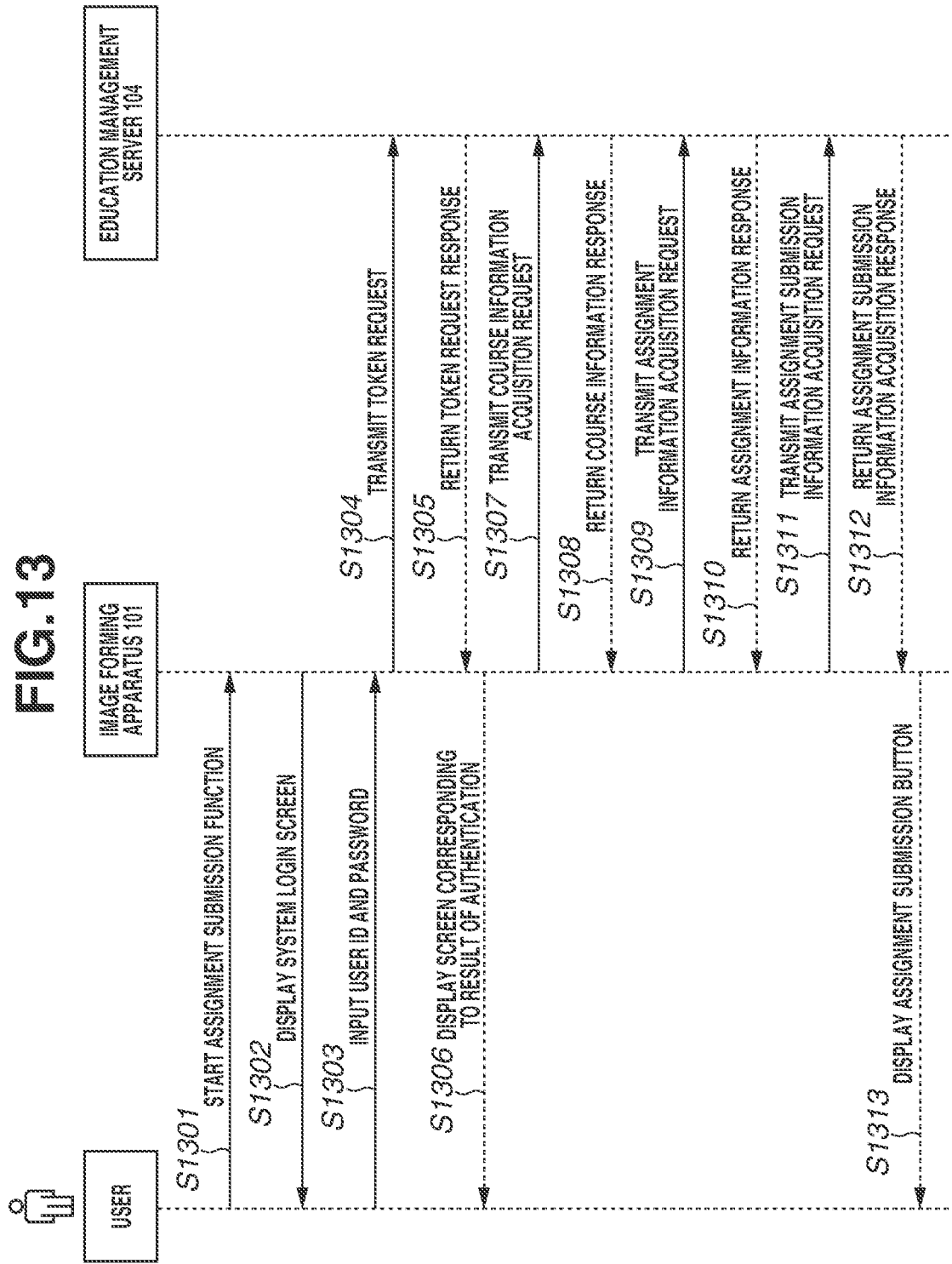
FIG. 13 is a diagram illustrating a sequence from logging in to the education management system to displaying an assignment submission button.

When a login button 404 is selected by a touch, authentication processing for the user is performed in a sequence illustrated in FIG. 13. When the authentication of the user is successful, the image forming apparatus 101 displays a screen illustrated in FIG. 6 on the operation unit 116, and acquires assignment information about assignment(s) that can be submitted by the user, from the education management server 104. When the login fails, the image forming apparatus 101 displays a screen illustrated in FIG. 5 on the operation unit 116.

Figure 6:
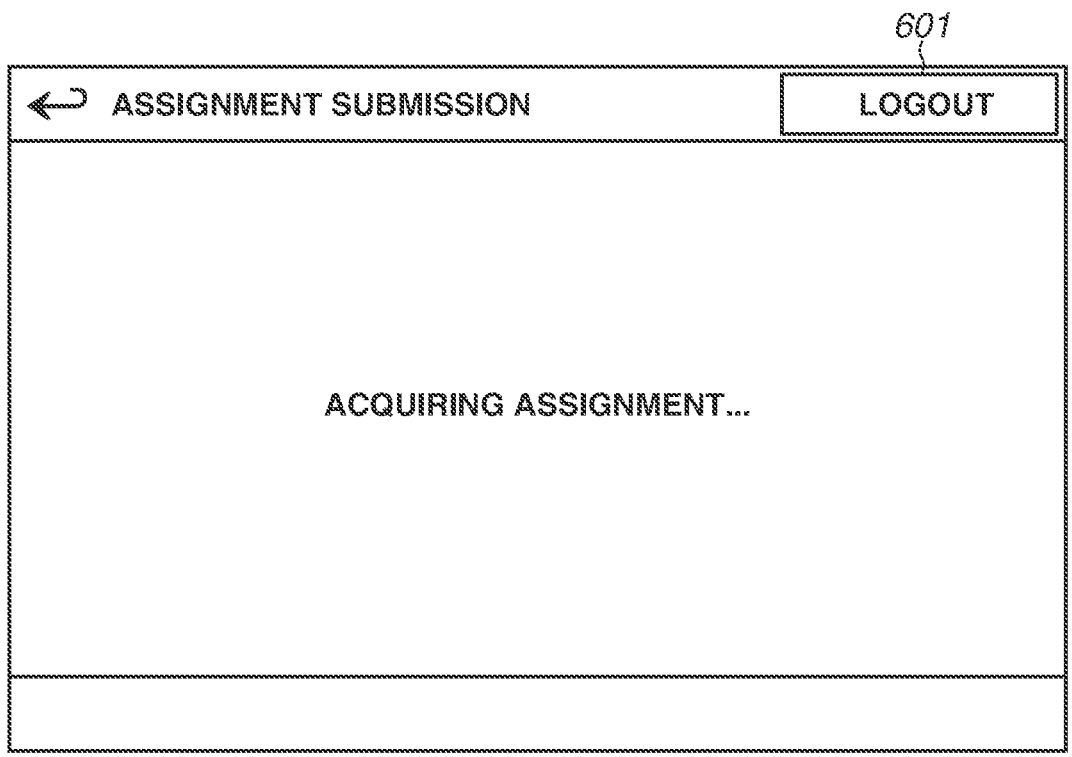
FIG. 6 is a diagram illustrating an example of a screen to be displayed during assignment acquisition from the education management system.

The screen illustrated in FIG. 6 is displayed on the operation unit 116 to indicate the processing in progress while the image forming apparatus 101 is acquiring the assignment information about assignment(s) that can be submitted by the user who has been authenticated and has logged in to the image forming apparatus 101, from the education management server 104. When the processing ends, the image forming apparatus 101 displays a screen illustrated in FIG. 7 on the operation unit 116.

Figure 7:
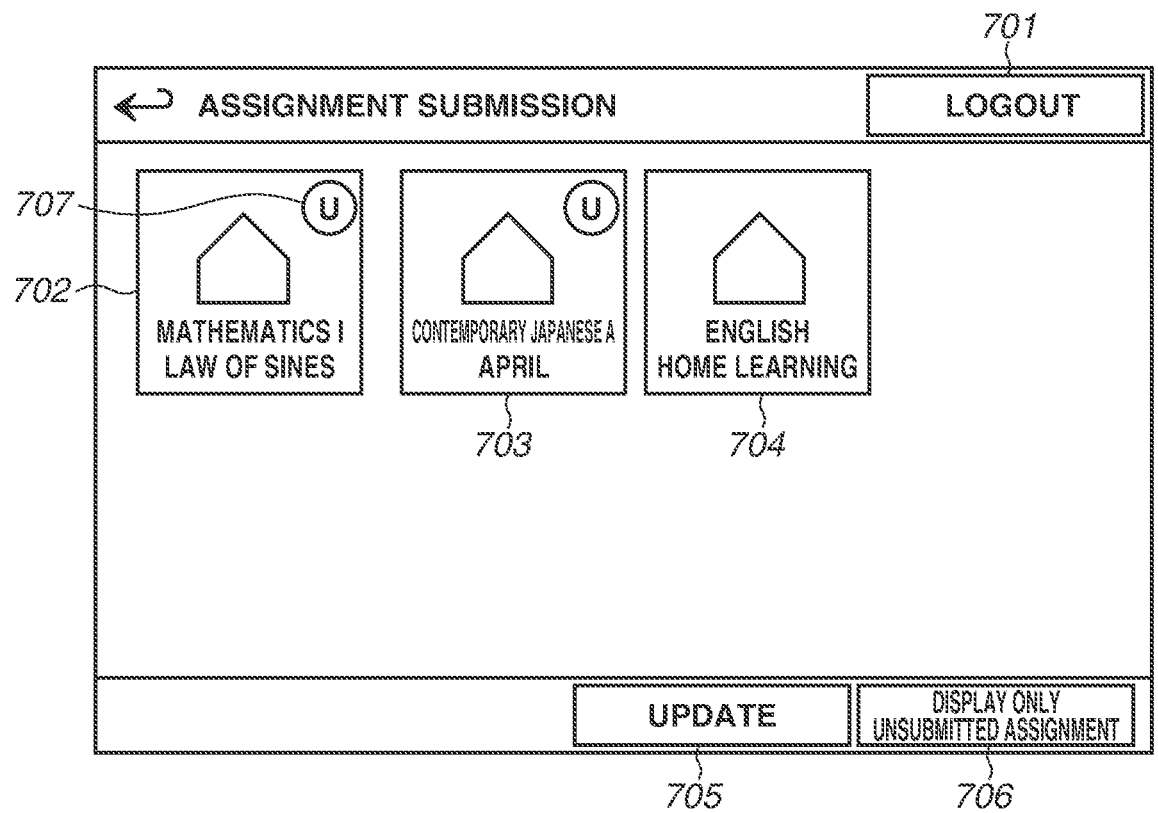
FIG. 7 is a diagram illustrating an example of a screen for the user to select an assignment to be submitted to the education management system.

The screen illustrated in FIG. 7 is a submission assignment selection screen for the user to specify which assignment is to be submitted. The screen in FIG. 7 displays assignment submission buttons (objects), i.e., button icons 702, 703, and 704. Text representing a lecture name (course information) and an assignment name of a submission target acquired from the education management server 104, and a mark indicating a submission state are attached to each of the assignment submission buttons. In a case where the submission state of an assignment is "unsubmitted", an assignment submission button thereof is displayed with an unsubmitted mark 707 indicating an unsubmitted state, which is represented by an encircled alphabet "U", added to the button icon. The user can easily recognize which assignment is not submitted yet by viewing the operation unit 116 of the image forming apparatus 101 and checking the unsubmitted mark 707.

In a case where an error has occurred in the acquisition of the assignment information or there is no assignment information that can be displayed, the image forming apparatus 101 displays a message to notify the user of such a situation on the operation unit 116. In addition, the image forming apparatus 101 displays a screen in a state where the assignment submission button such as the button icons 702, 703, and 704 are not displayed, on the operation unit 116.

When an update button 705 is pressed, the image forming apparatus 101 acquires the assignment information again from the education management server 104, and changes the displayed assignment submission buttons based on the acquired assignment information. When a "display only unsubmitted assignment" button 706 is pressed, the image forming apparatus 101 changes the screen in FIG. 7 to a screen in FIG. 8.

Figure 8:
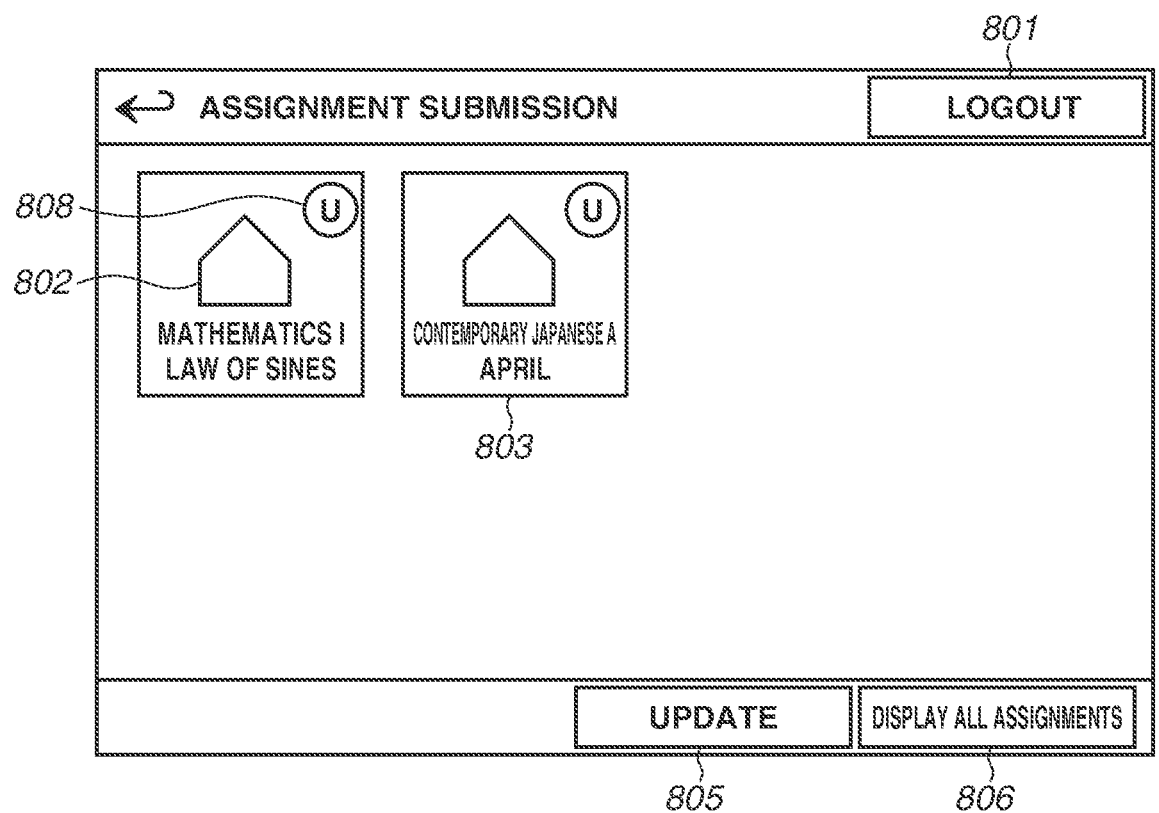
FIG. 8 is a diagram illustrating an example of a screen for the user to select an assignment to be submitted to the education management system.

The screen in FIG. 8 displays only the assignment submission button indicating the submission state of the assignment is "unsubmitted". In a case where the submission state of an assignment is "unsubmitted", an assignment submission button thereof is displayed with an unsubmitted mark 808 indicating an unsubmitted state added to the button icon, in a manner similar to FIG. 7.

Operation when an update button 805 is pressed is similar to the operation when the update button 705 is pressed.

When a "display all assignments" button 806 is pressed, the image forming apparatus 101 changes the screen illustrated in FIG. 8 to the screen illustrated in FIG. 7.

When any of logout buttons 601, 701, and 801 illustrated in FIGS. 6, 7, and 8, respectively, is pressed, or when the displayed screen returns to the home screen, the user ID 401 and the password 402 stored in the RAM 113 are cleared. When the authentication has failed, the screen in FIG. 5 appears, and when a close button 501 is pressed, the screen returns to the screen in FIG. 4.

Figure 9:
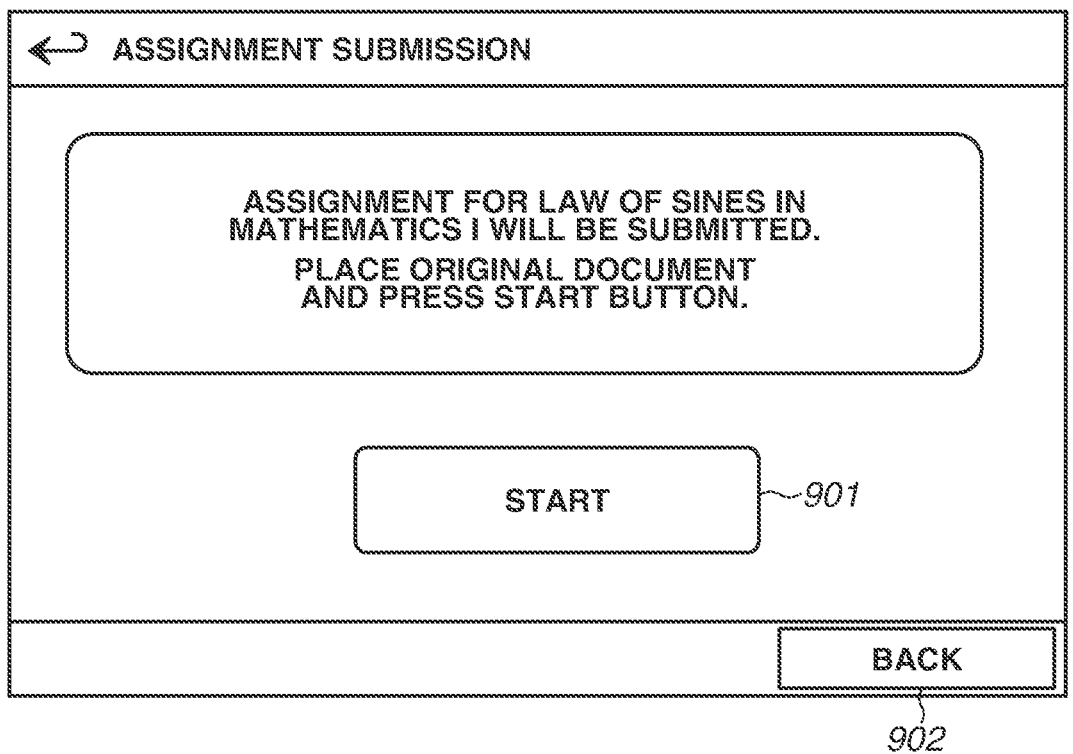
FIG. 9 is a diagram illustrating an example of a start confirmation screen in assignment submission to the education management system.

FIG. 9 illustrates an example of a screen to be displayed when an assignment submission button 802 for "Law of Sines" associated with a "Mathematics I" course is selected. The screen in FIG. 9 displays a message prompting the user to place an original document and start of reading, and a start button 901 for issuing an instruction to start reading. In addition, a back button 902 used to return to the screen in FIG. 7 or FIG. 8 without starting reading is displayed.

Figure 10:
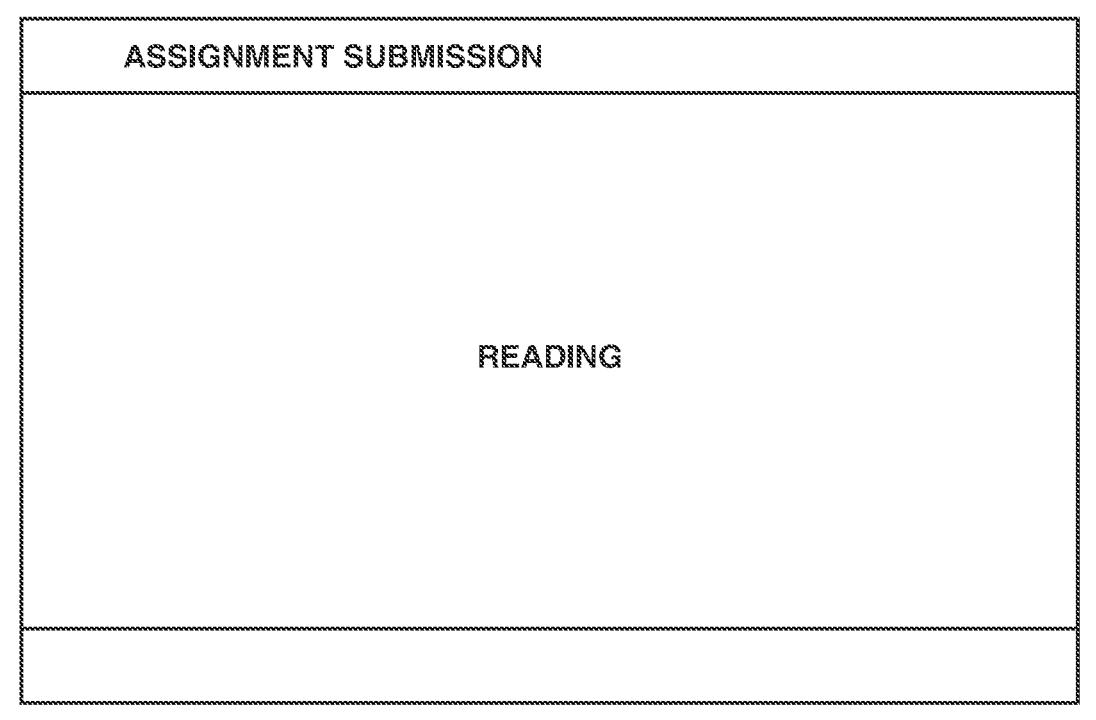
Figure 11:
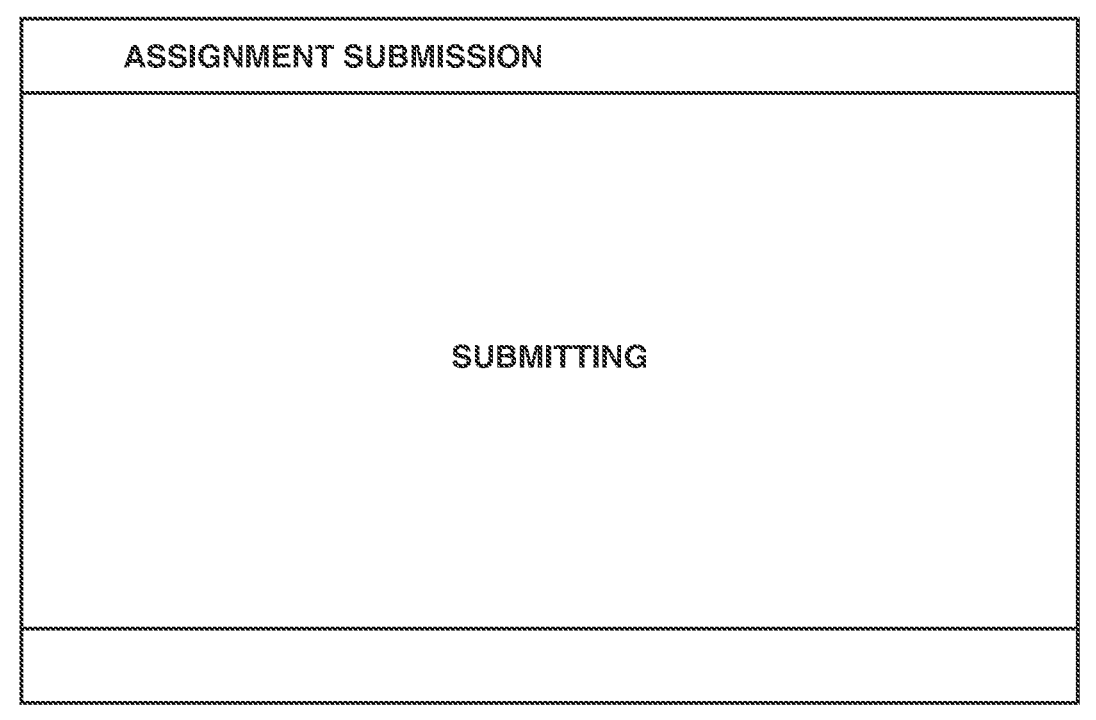

FIG. 10 illustrates an example of a screen to be displayed on the operation unit 116 while the reading unit 118 is reading the original document after the start button 901 is selected. FIG. 11 illustrates an example of a screen to be displayed during processing for submitting image data generated by the reading unit 118 reading the original document to the education management system. The processing is performed after reading of the original document by the reading unit 118 is completed.

Figure 12:
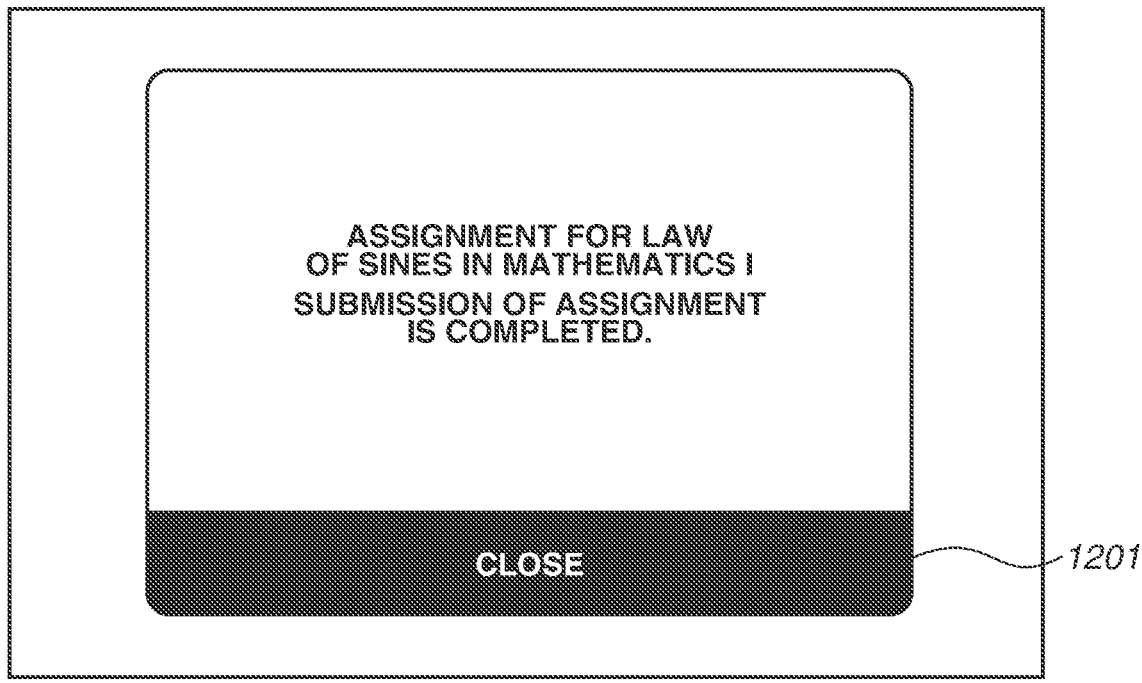
FIG. 12 is a diagram illustrating an example of a screen to be displayed when the processing for submission to the education management system is completed.

FIG. 12 illustrates an example of a screen to be displayed on the operation unit 116 when the submission processing is normally completed. When a close button 1201 is pressed, the image forming apparatus 101 changes the displayed screen to the screen in FIG. 7 or FIG. 8.

FIG. 13 is a diagram illustrating a sequence from when the user logs in to the image forming apparatus 101 to when the assignment submission button is displayed on the operation unit 116. Processing by the image forming apparatus 101 in FIG. 13 is performed by the CPU 111 reading a program stored in the ROM 112 into the RAM 113 and executing the program. Processing by the education management server 104 in FIG. 13 is performed by a CPU of the education management server 104 reading a program stored in a ROM of the education management server 104 into a RAM of the education management server 104 and executing the program.

In step S1301, the user presses the assignment submission button 303 on the operation unit 116 of the image forming apparatus 101 in order to access the education management server 104 from the image forming apparatus 101.

In step S1302, the CPU 111 of the image forming apparatus 101 displays the system login screen in FIG. 4 on the operation unit 116.

In step S1303, the user inputs the user ID 401 and the password 402 in the system login screen in FIG. 4, and presses the login button 404 upon completing the input.

In step S1304, when the login button 404 is pressed, the CPU 111 of the image forming apparatus 101 transmits a token request including the user ID 401 and the password 402 input by the user to the education management server 104.

The education management server 104 authenticates the user by comparing the received token request with a list including a user ID and a password for each user registered beforehand. If the user ID and the password of the token request are included in the list, authentication based on the user ID and the password of the token request is successful. On the other hand, if the user ID and the password of the token request are not included in the list, the authentication based on the user ID and the password of the token request fails. Subsequently, in step S1305, the education management server 104 returns a token request response including a result of the authentication to the image forming apparatus 101.

In step S1306, upon receiving the token request response transmitted in step S1305, the CPU 111 of the image forming apparatus 101 displays a screen corresponding to the result of the authentication included in the token request response on the operation unit 116. In other words, the CPU 111 displays the screen illustrated in FIG. 5 on the operation unit 116 if the result of the authentication is a failure. On the other hand, if the result of the authentication is a success, the CPU 111 stores an access token included in the token request response in the storage 114 of the image forming apparatus 101 in association with the user ID of the authenticated user, and displays the screen in FIG. 6 on the operation unit 116. Subsequently, in step S1307, the image forming apparatus 101 transmits a course information acquisition request to the education management server 104 using the access token stored in the storage 114. In the course information acquisition request, acquisition of the currently valid course information is requested using the user ID and the access token.

In step S1308, the education management server 104 returns a course information response to the image forming apparatus 101 as a response to the course information acquisition request. The course information response includes course information indicating a currently valid course in a list of courses to which the user indicated by the user ID corresponding to the transmitted access token belongs, based on the course information acquisition request. The course information response includes zero or more pieces of course information. In the present exemplary embodiment, the course information includes information about "course ID" and "course name".

In step S1309, if the course information is successfully acquired, the image forming apparatus 101 further transmits an assignment information acquisition request for each course to the education management server 104 using each course ID.

In step S1310, the education management server 104 returns a list of assignment information associated with each course ID to the image forming apparatus 101 as a response to the assignment information acquisition request, i.e., an assignment information response. The assignment information response includes zero or more pieces of assignment information. In the present exemplary embodiment, the assignment information includes "assignment ID" and "assignment name". In step S1311, upon successfully acquiring the assignment information, the image forming apparatus 101 further transmits an assignment submission information acquisition request for each assignment using "course ID", "assignment ID", and "user ID" of each assignment.

In step S1312, the education management server 104 transmits assignment submission information identified from "course ID", "assignment ID", and "user ID" as a response to the assignment submission information acquisition request.

The assignment submission information includes "assignment submission information ID" and "submission state". The CPU 111 of the image forming apparatus 101 stores "course ID", "course name", "assignment ID", "assignment name", "assignment submission information ID", and "submission state" in the storage 114 in association with the assignment submission button, as assignment submission button information. Further, in step S1313, the image forming apparatus 101 displays the screen in FIG. 7 or FIG. 8 described above on the operation unit 116 based on the acquired "course name", "assignment name", and "submission state".

Specifically, the CPU 111 displays the button having the acquired "assignment name" for each assignment on the operation unit 116. In FIG. 7, the button icon 702 having the name of the assignment, "Mathematics I, Law of Sines", the button icon 703 having the name of the assignment "Contemporary Japanese A, April", and the button icon 704 having the name of the assignment "English, Home Learning" are displayed. From these button icons 702, 703 and 704, the user selects the button icon of an assignment that the user wants to submit. Further, when displaying the button icons, with regard to the button icon of the assignment having the acquired "submission state" that is "unsubmitted", the CPU 111 adds the unsubmitted mark 707 indicating an unsubmitted state to the button icon and displays the button icon.

Figure 14:
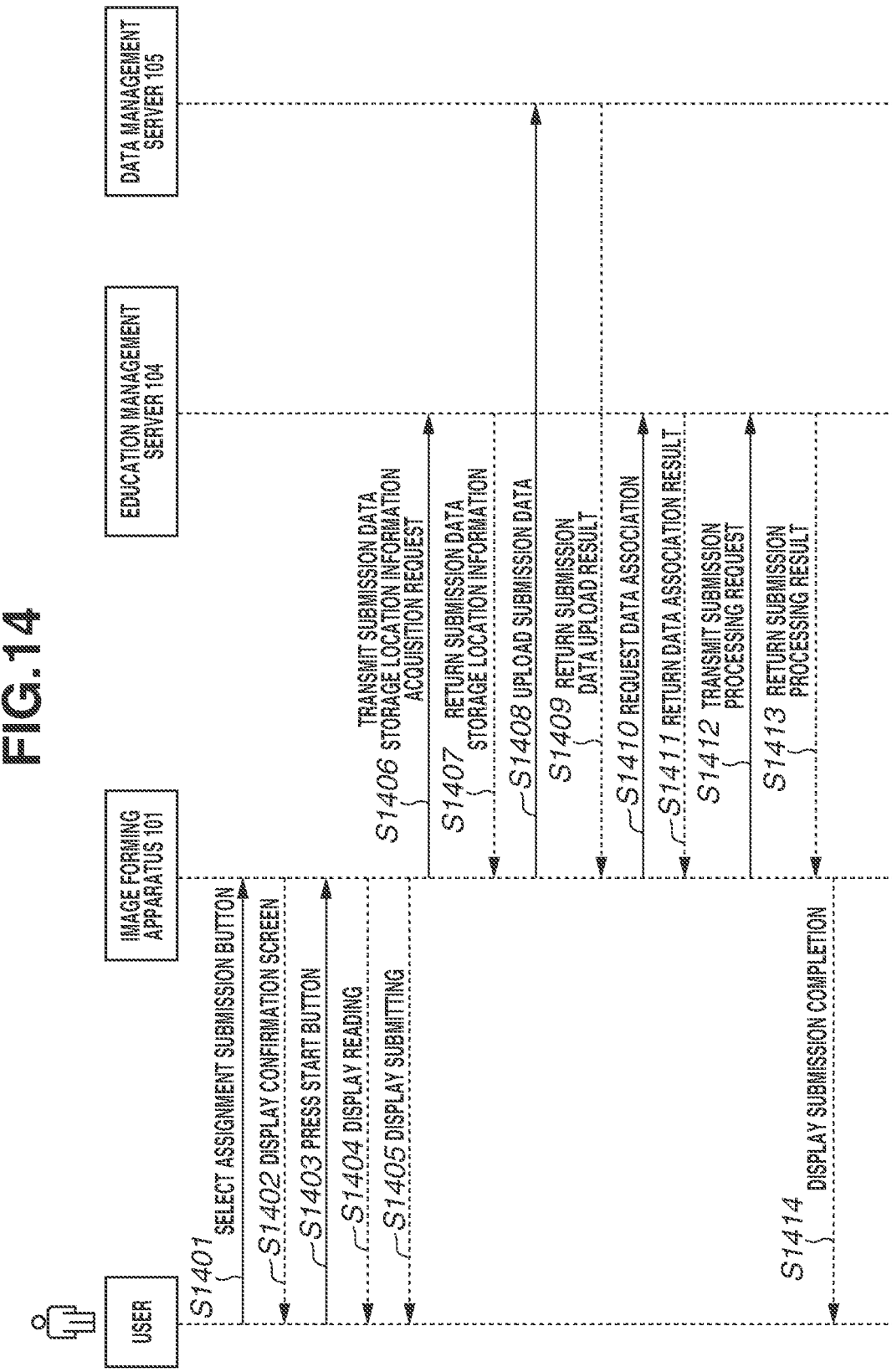
FIG. 14 is a diagram illustrating a sequence from pressing of the assignment submission button to completion of assignment submission.

FIG. 14 is a diagram illustrating a sequence of processing for submitting the assignment to the education management server 104, starting from reading of the original document at a press of the assignment submission button by the user. Processing by the image forming apparatus 101 in FIG. 14 is performed by the CPU 111 reading a program stored in the ROM 112 into the RAM 113 and executing the program. Processing by the education management server 104 in FIG. 14 is performed by the CPU of the education management server 104 reading a program stored in the ROM of the education management server 104 into the RAM of the education management server 104 and executing the program. Processing by the data management server 105 in FIG. 14 is performed by a CPU of the data management server 105 reading a program stored in a ROM of the data management server 105 into a RAM of the data management server 105 and executing the program.

In step S1401, the user selects the assignment submission button (any one of the button icons 702 to 704 and 802 to 803).

In step S1402, when the assignment submission button is selected, the CPU 111 of the image forming apparatus 101 displays the confirmation screen illustrated in FIG. 9 on the operation unit 116. The confirmation screen in FIG. 9 includes the message prompting the user to place an original document, and the start button 901.

In step S1403, the user presses the start button 901 in FIG. 9. Then, the CPU 111 of the image forming apparatus 101 starts reading of the original document by the reading unit 118. Subsequently, in step S1404, the CPU 111 of the image forming apparatus 101 displays the screen in FIG. 10 on the operation unit 116.

Subsequently, in step S1405, when the reading of the original document is completed, the CPU 111 of the image forming apparatus 101 displays the screen illustrated in FIG. 11 on the operation unit 116. Further, in step S1406, using the course ID and the user ID associated with the pressed assignment submission button, the image forming apparatus 101 transmits an acquisition request for acquiring submission data storage location information, which is a data storage area managed by the data management server 105, to the education management server 104.

In step S1407, the education management server 104 returns the submission data storage location information (Uniform Resource Locator (URL)) corresponding to the course ID and the user ID included in the received acquisition request, as a response.

In step S1408, the image forming apparatus 101 uploads the read image data to a submission data storage location obtained from the acquired submission data storage location information.

In step S1409, the data management server 105 stores the received image data in association with identification information (a file ID) uniquely identifying the received image data, and returns a data storage result and the file ID to the image forming apparatus 101.

In step S1410, upon receiving the file ID from the data management server 105, the image forming apparatus 101 transmits "assignment submission information ID" and "file ID" to the education management server 104, and requests the education management server 104 to perform association processing for associating the assignment submission information with the file ID. By executing the association processing, the education management server 104 can recognize which file having the certain file ID in the data management server 105 is the file corresponding to the certain assignment submission information. As a result, for example, a grader can later access the education management server 104 using a personal computer (PC) or the like and specify an assignment, and then the education management server 104 can acquire a submitted document for the assignment and display the acquired document, so that the grader can easily view the submitted document.

In step S1411, the education management server 104 executes the association processing for associating the assignment submission information with the file ID, and returns the result of the processing.

In step S1412, the image forming apparatus 101 further transmits a submission processing request to the education management server 104 using "course ID", "assignment ID", and "assignment submission information ID".

Upon receiving the submission processing request, the education management server 104 brings the assignment submission information into a submitted state. A user of an account having the authority of a teacher in each course is thereby permitted to access the file ID associated with the assignment.

In step S1413, upon completion of the submission processing, the education management server 104 returns a submission processing result to the image forming apparatus 101 as a response. In step S1414, upon receiving the submission processing result, the CPU 111 of the image forming apparatus 101 displays the screen illustrated in FIG. 12 on the operation unit 116.

Figure 16:
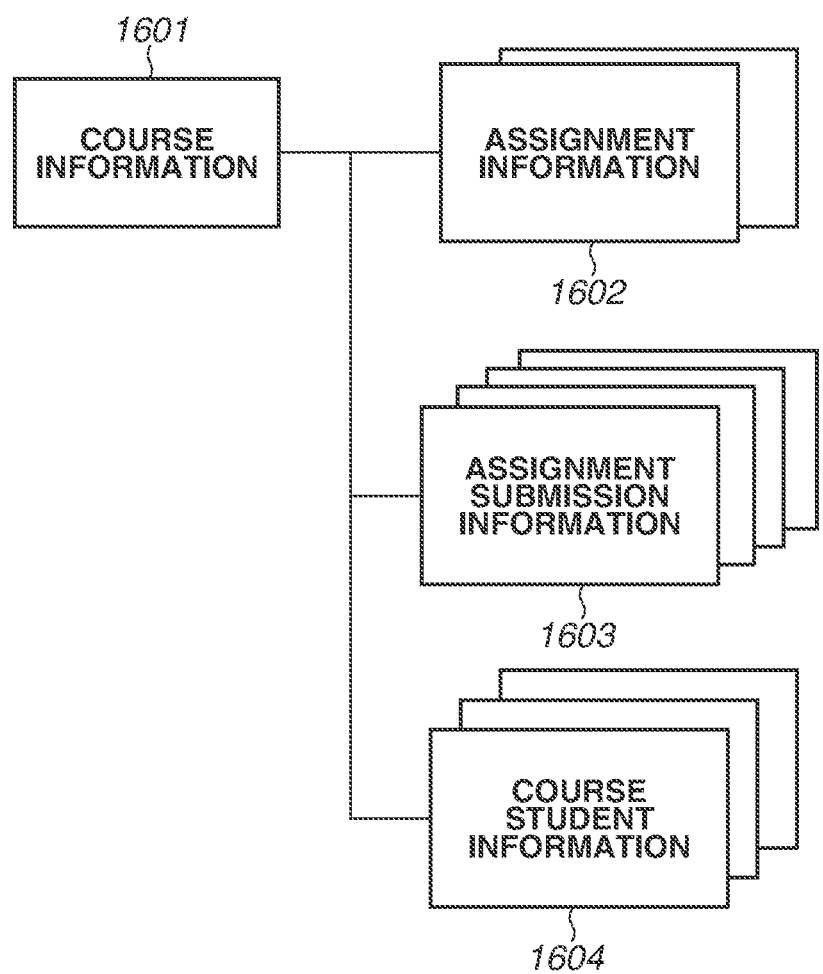
FIG. 16 is a diagram illustrating a structure of data managed by an education management server.

FIG. 16 illustrates a structure of data related to the present disclosure, managed by the education management server 104. The education management server 104 has a plurality of pieces of course information 1601. A plurality of pieces of assignment information 1602, assignment submission information 1603, course student information 1604, and course teacher information (not illustrated) are associated with each other, under one piece of course information 1601.

The course information 1601 is information about each education course such as "mathematics course" and "English course". The course information 1601 includes information about a course ID uniquely identifying a course, a course name, and a course state indicating the state of the course.

The assignment information 1602 is information about each assignment such as "Mathematics I, Law of Sines", and "Contemporary Japanese A, April". The assignment information 1602 includes a course ID for identifying which course an assignment belongs to, an assignment ID for uniquely identifying an assignment, the type of assignment data, a file storage location of the assignment data, a file ID of the assignment data, and information about the state of an assignment.

The assignment submission information 1603 is information about submission of an assignment by each student who can be identified from the assignment information and the student information. The assignment submission information 1603 includes a course ID, an assignment ID, an assignment name, a user ID, and the submission state of the assignment.

The course student information 1604 is information about a student belonging to each course. The course student information 1604 includes a course ID, a user ID, and submission data storage location information.

Figure 15:
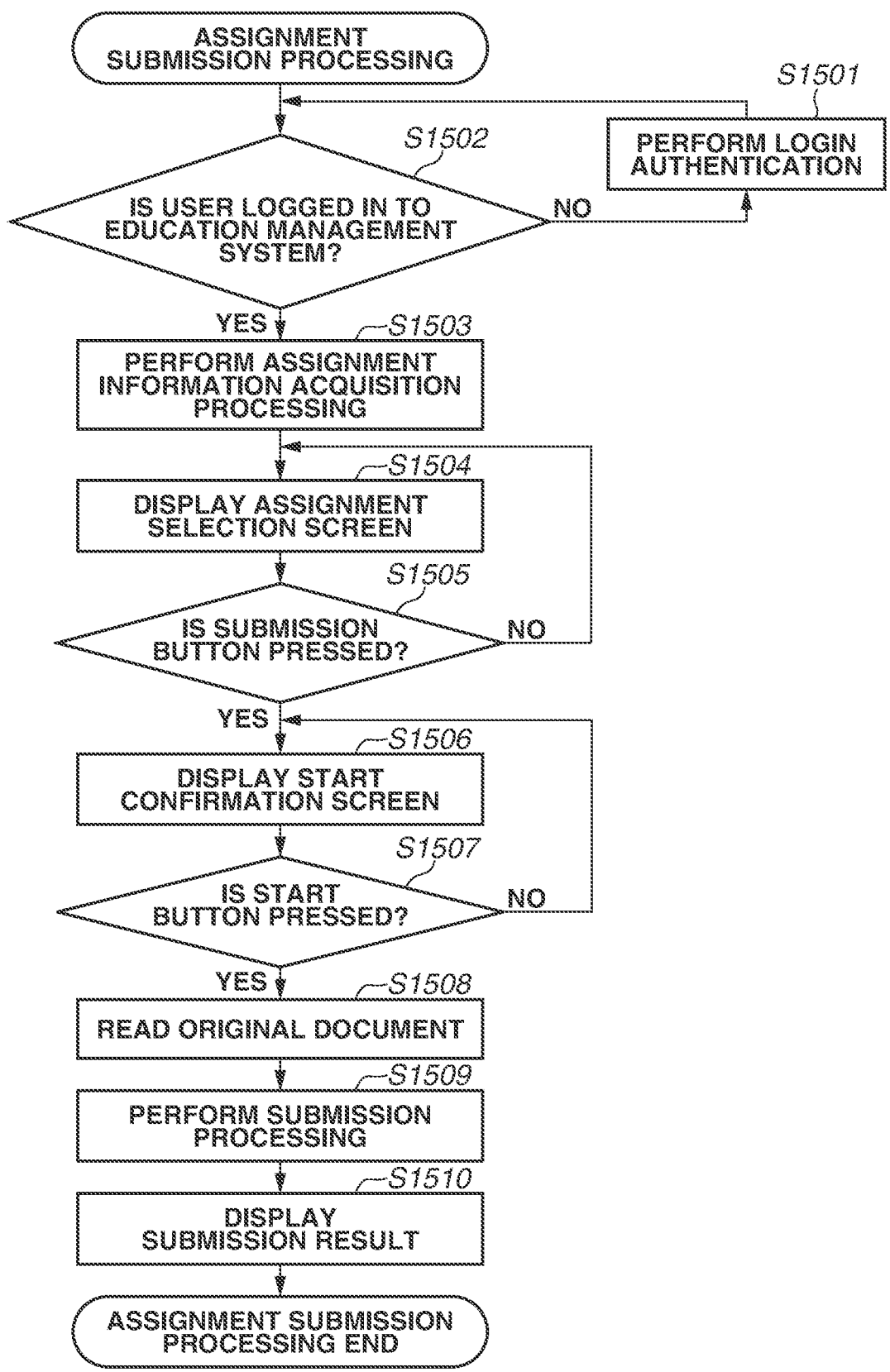
FIG. 15 is a flowchart illustrating processing for an assignment submission function in the image forming apparatus.

FIG. 15 is a flowchart illustrating processing for the assignment submission function in the image forming apparatus 101. The processing illustrated in the flowchart in FIG. 15 is performed by the CPU 111 of the image forming apparatus 101 readings a program stored in the ROM 112 into the RAM 113 and executing the program. The processing illustrated in the flowchart in FIG. 15 starts when the assignment submission button 303 in FIG. 3 is pressed.

In step S1502, the CPU 111 confirms whether the user has logged in to the education management system. If the user has not logged in to the education management system (NO in step S1502), then in step S1501, the CPU 111 displays the login screen in FIG. 4 on the operation unit 116, and performs the authentication processing for the user in step S1303 to step S1305 in FIG. 13.

If the user has logged in to the education management system (YES in step S1502), the processing proceeds to step S1503. In step S1503, the CPU 111 performs the assignment information acquisition processing described with reference to FIG. 13. Specifically, the CPU 111 transmits the course information acquisition request in step S1307, the assignment information acquisition request in step S1309, and the assignment submission information acquisition request in step S1311 to the education management server 104, sequentially. The transmission of the assignment submission information acquisition request in step S1311 is executed for all the assignment IDs acquired using the assignment information acquisition request transmitted in step S1309, sequentially.

Here, the processing by the education management server 104 when each of the requests is made will be described.

Figure 17:
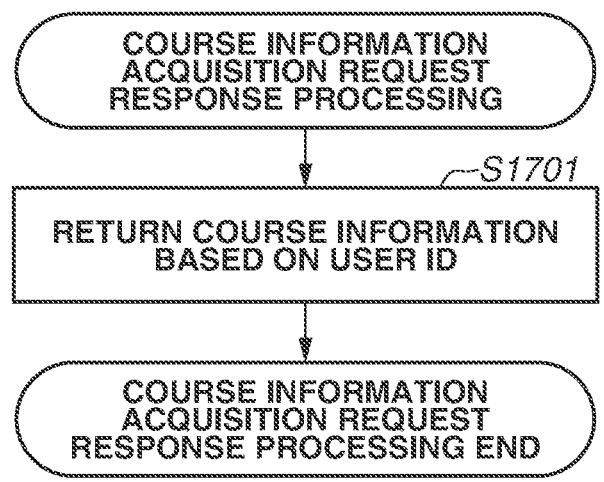
FIG. 17 is a flowchart illustrating processing in the education management server at the time of receiving a course information acquisition request.

FIG. 17 is a flowchart illustrating processing in the education management server 104 when the education management server 104 receives the course information acquisition request transmitted in step S1307. The processing illustrated in the flowchart in FIG. 17 is performed by the CPU of the education management server 104 reading a program stored in the ROM of the education management server 104 into the RAM of the education management server 104 and execution of the program by.

The course information acquisition request transmitted from the image forming apparatus 101 in step S1307 includes a user ID.

In step S1701, upon receiving the course information acquisition request transmitted in step S1307, the education management server 104 returns the currently valid course information among the course information to which the received user ID belongs, to the image forming apparatus 101.

Figure 18:
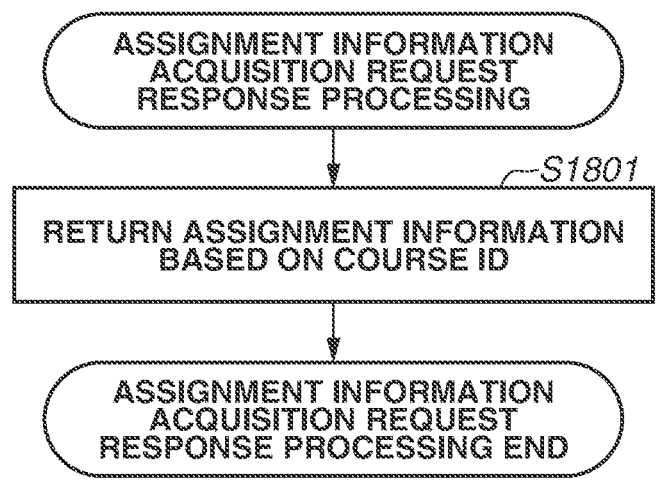
FIG. 18 is a flowchart illustrating processing in the education management server at the time of receiving an assignment information acquisition request.

FIG. 18 is a flowchart illustrating processing when the education management server 104 receives the assignment information acquisition request transmitted in step S1309. The processing illustrated in the flowchart in FIG. 18 is performed by the CPU of the education management server 104 reading a program stored in the ROM of the education management server 104 into the RAM of the education management server 104 and executing the program.

The assignment information acquisition request transmitted from the image forming apparatus 101 in step S1309 includes a course ID.

In step S1801, upon receiving the assignment information acquisition request transmitted in step S1309, the education management server 104 returns assignment information having an assignment state of "valid" among the assignment information to which the received course ID belongs, to the image forming apparatus 101.

Figure 19:
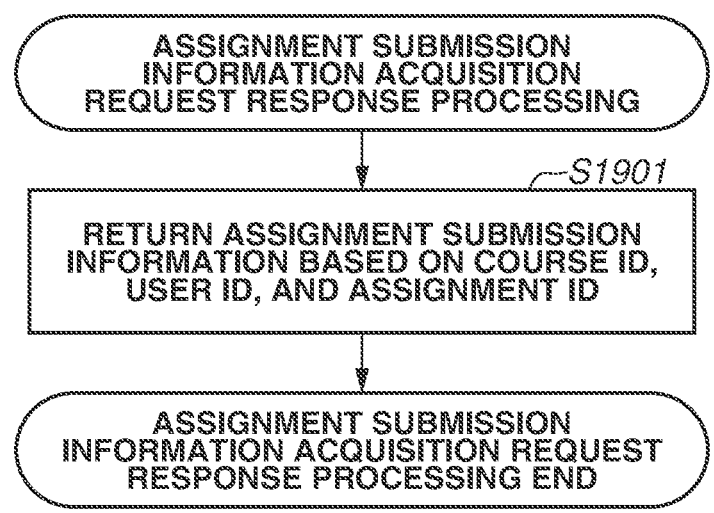
FIG. 19 is a flowchart illustrating processing in the education management server at the time of receiving an assignment submission information acquisition request.

FIG. 19 is a flowchart illustrating processing when the education management server 104 receives the assignment submission information acquisition request transmitted in step S1311. The processing illustrated in the flowchart in FIG. 19 is performed by the CPU of the education management server 104 reading a program stored in the ROM of the education management server 104 into the RAM of the education management server 104 and executing the program.

The assignment submission information acquisition request transmitted from the image forming apparatus 101 in step S1311 includes a course ID, a user ID, and an assignment ID. In step S1901, upon receiving the assignment submission information acquisition request transmitted in step S1311, the education management server 104 returns assignment submission information identified from the received course ID, user ID, and assignment ID, to the image forming apparatus 101.

The description is provided with reference to the flowchart in FIG. 15 again. In step S1504, upon completing the assignment information acquisition processing in step S1503, the CPU 111 displays the screen illustrated in FIG. 7 or FIG. 8 on the operation unit 116 based on the assignment submission information received in step S1312.

In step S1505, the CPU 111 determines whether the assignment submission button in FIG. 7 or FIG. 8 is pressed. If the assignment submission button is pressed (YES in step S1505), the processing proceeds to step S1506. In step S1506, the CPU 111 displays the screen illustrated in FIG. 9 on the operation unit 116.

In step S1507, the CPU 111 of the image forming apparatus 101 determines whether the start button 901 in FIG. 9 is pressed. If the start button 901 is pressed (YES in step S1507), the processing proceeds to step S1508. In step S1508, the CPU 111 of the image forming apparatus 101 starts reading of an original document by the reading unit 118. Read settings for the reading of the original document may be default read settings of one-sided, 600 dpi×300 dpi, and polychrome reading, or the user may make the read settings beforehand via the operation unit 116 as settings to be used when the assignment submission button 303 is pressed. Subsequently, in step S1508, the CPU 111 creates submission data by converting image data generated by reading the original document into a predetermined format. An example of the predetermined format is the PDF. Which format is to be used as the predetermined format may be set beforehand via the operation unit 116. Further, addition of predetermined meta information to the image data and/or conversion of resolution may be performed in step S1508. In step S1509, upon generation of the image data, the CPU 111 executes the submission processing.

In the submission processing in step S1509, the CPU 111 transmits the submission data storage location information acquisition request in step S1406, uploads the submission data in step S1408, transmits the data association request in step S1410, and transmits the submission processing request in step S1412, as described with reference to FIG. 14. In a case where the submission state of the assignment included in the assignment submission information is "submitted", the CPU 111 transmits a submission status change request (not illustrated) to the education management server 104 before uploading the submission data in step S1408. Upon receiving the submission status change request, the education management server 104 deletes the authority of a teacher user to refer to registered submission data, for assignment submission information identified from a course ID, an assignment ID, and a user ID included in the received submission status change request. Subsequently, the education management server 104 adds write authority to a student user. Further, the education management server 104 changes the submission state of the assignment of the assignment submission information 1603 to "unsubmitted".

Figure 20:
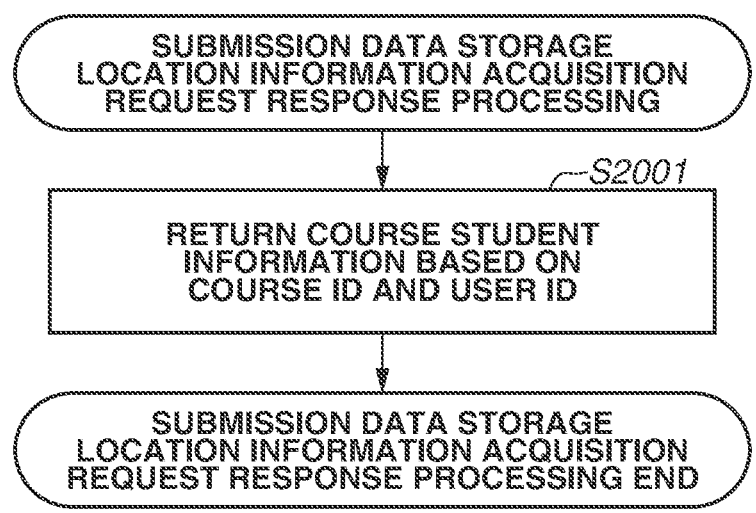
FIG. 20 is a flowchart illustrating processing in the education management server at the time of receiving a submission data storage location information acquisition request.

FIG. 20 is a flowchart illustrating processing when the education management server 104 receives the submission data storage location information acquisition request transmitted in step S1406. The processing illustrated in the flowchart in FIG. 20 is performed by the CPU of the education management server 104 reading a program stored in the ROM of the education management server 104 into the RAM of the education management server 104 and executing the program. The submission data storage location information acquisition request transmitted from the image forming apparatus 101 in step S1406 includes a course ID and a user ID.

In step S2001, upon receiving the submission data storage location information acquisition request transmitted in step S1406, the education management server 104 returns the course student information 1604 identified from the received course ID and user ID, to the image forming apparatus 101.

The image forming apparatus 101 refers to the submission data storage location information included in the course student information 1604. The image forming apparatus 101 then uploads the submission data to the submission data storage location managed by the data management server 105 based on the submission data storage location information in step S1408.

Upon completing the processing for storing the submission data, the data management server 105 returns a submission data upload result to the image forming apparatus 101 in step S1409. The submission data upload result in step S1409 includes file ID information that is an ID for managing the submission data on the data management server 105.

Figure 21:
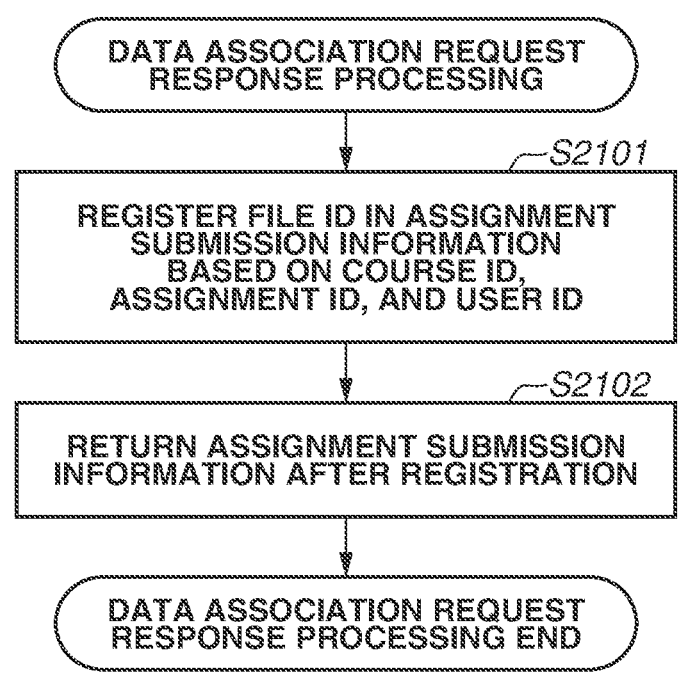
FIG. 21 is a flowchart illustrating processing in the education management server at the time of receiving a data association request.

FIG. 21 is a flowchart illustrating processing when the education management server 104 receives the data association request transmitted in step S1410. The processing illustrated in the flowchart in FIG. 21 is performed by the CPU of the education management server 104 reading a program stored in the ROM of the education management server 104 into the RAM of the education management server 104 and executing the program.

In step S2101, upon receiving the data association request transmitted in step S1410, the education management server 104 registers the received file ID information in the assignment submission information 1603 identified from the received course ID, assignment ID, and user ID. Further, in step S2102, the education management server 104 returns the assignment submission information 1603 after the registration of the file ID information to the image forming apparatus 101.

Figure 22:
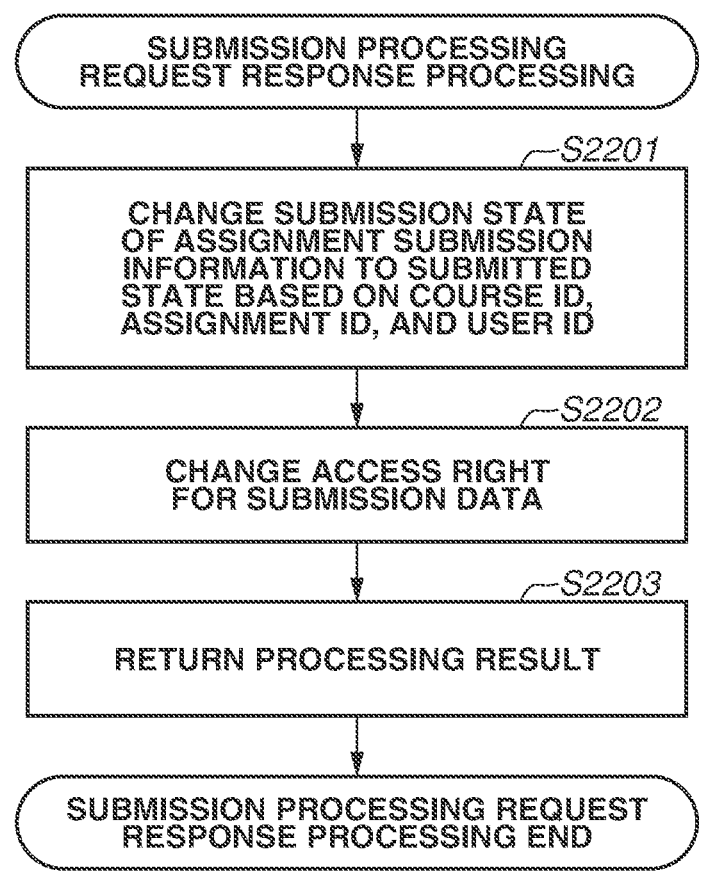
FIG. 22 is a flowchart illustrating processing in the education management server at the time of receiving a submission processing request.

FIG. 22 is a flowchart illustrating processing when the education management server 104 receives the submission processing request transmitted in step S1412. The processing illustrated in the flowchart in FIG. 22 is performed by the CPU of the education management server 104 reading a program stored in the ROM of the education management server 104 into the RAM of the education management server 104 and executing the program.

The submission processing request transmitted from the image forming apparatus 101 in step S1412 includes a course ID, an assignment ID, and a user ID.

In step S2201, upon receiving the submission processing request transmitted in step S1412, the education management server 104 changes the submission state of the assignment of the assignment submission information 1603 identified from the received course ID, assignment ID, and user ID to "submitted". Further, in step S2202, the education management server 104 requests the data management server 105 to change the access right for the submission data registered in the assignment submission information 1603, so that writing on the submission data is disabled and a user having a teacher ID of the course is enabled to refer to the submission data.

In step S2203, the education management server 104 notifies the image forming apparatus 101 of whether the processing is successful or unsuccessful and information indicating the cause if the processing is unsuccessful as processing result information in step S1413. In a case where the processing is unsuccessful, the education management server 104 returns each of the assignment submission information changed in step S2201 and the access right for the submission data changed in step S2202 to the state before the start of step S2201.

In step S1510, which is submission result display processing, the CPU 111 of the image forming apparatus 101 displays the screen in FIG. 12 on the operation unit 116 if the submission processing result received from the education management server 104 in step S1413 is a success. If the submission processing result is a failure, the CPU 111 displays a screen indicating a failure on the operation unit 116.

Such processing makes it possible to read the original document and submit the generated image data to the education management system, easily.

The assignment stored in the education management server 104 may be downloaded and printed on the image forming apparatus 101 described above. In that case, an assignment print button may be displayed on the home screen illustrated in FIG. 3 of the image forming apparatus 101, and the assignment may be printed by a press of the assignment print button.

FIG. 23 is a sequence diagram illustrating operation when the assignment print button (not illustrated) displayed on the operation unit 116 is pressed. Processing by the image forming apparatus 101 in FIG. 23 is performed by the CPU 111 reading a program stored in the ROM 112 into the RAM 113 and executing the program. Processing by the education management server 104 in FIG. 23 is performed by the CPU of the education management server 104 reading a program stored in the ROM of the education management server 104 into the RAM of the education management server 104 and executing the program. Processing by the data management server 105 in FIG. 23 is performed by the CPU of the data management server 105 reading a program stored in the ROM of the data management server 105 into the RAM of the data management server 105 and executing the program.

Processing in step S2302 to step S2312 is similar to processing in step S1302 to step S1312 illustrated in FIG. 13, and thus detailed description thereof will be omitted.

The image forming apparatus 101 determines whether an assignment can be printed, based on an assignment type included in assignment information acquired from the education management server 104 in step S2309 and step S2310. Subsequently, in step S2313, if the assignment can be printed, the CPU 111 displays the screen including an assignment print button for providing an instruction to print an assignment on the operation unit 116 based on "course name", "assignment name", and "submission state" acquired from the education management server 104.

In step S2314, the user presses the assignment print button. Then, the CPU 111 acquires storage location information and an assignment file ID of an assignment file included in the assignment information acquired from the education management server 104 in step S2309 and step S2310. Subsequently, in step S2315 and step S2316, the image forming apparatus 101 receives print assignment data identified by the acquired storage location information and assignment file ID of the assignment file from the data management server 105. In step S2317, upon receiving the print assignment data, the image forming apparatus 101 prints the assignment based on the received print assignment data.

By such processing, the user can easily print an assignment that the user wants to print by operating the image forming apparatus 101.

Other Exemplary Embodiments

In the present exemplary embodiment, the form in which the course information and the assignment information are acquired without being selected by the user, the plurality of button icons is displayed based on the acquired information, and the user selects an assignment for submission from among the button icons has been described as an example. However, the present disclosure is not limited to this example. For example, there may be adopted a stepwise selection form in which the user selects the course information, only assignment information corresponding to the selected course is received, and the user selects a piece of assignment information from the received assignment information.

In addition, in the present exemplary embodiment, the education management server 104 and the data management server 105 are described to be communicatively connected via the Internet 103, but exemplary embodiments of the present disclosure are not limited thereto. A configuration in which these servers are on the same network as the network of the image forming apparatus 101 may be adopted.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-166727, filed Oct. 11, 2021, which is hereby incorporated by reference herein in its entirety.

What is claimed is:

1. An image processing apparatus comprising:
a reading unit configured to read an original document;
a specifying unit configured to specify an assignment;
a receiving unit configured to receive, from a first server, storage location information indicating a storage location in a second server corresponding to the assignment specified by the specifying unit;
a transmitting unit configured to transmit image data generated by reading of the original document by the reading unit to the storage location indicated based on the storage location information received by the receiving unit; and
a notifying unit configured to notify the first server of identification information for identifying the image data.

2. The image processing apparatus according to claim 1, wherein the notifying unit receives the identification information for identifying the image data from the second server, and notifies the first server of the received identification information.

3. The image processing apparatus according to claim 1, further comprising an obtaining unit configured to obtain assignment information,
wherein the specifying unit specifies the assignment based on the assignment information obtained by the obtaining unit.

4. The image processing apparatus according to claim 3, further comprising a displaying unit configured to display objects for respective assignments based on the assignment information obtained by the obtaining unit,
wherein the specifying unit specifies an assignment by selecting an object from among the objects for the respective assignments.

5. The image processing apparatus according to claim 4, wherein the obtaining unit further obtains assignment submission information indicating whether an assignment is submitted or not, and
wherein the displaying unit displays an object corresponding to a submitted assignment and an object corresponding to an unsubmitted assignment based on the assignment submission information obtained by the obtaining unit.

6. The image processing apparatus according to claim 5, wherein the displaying unit displays information enabling a user to recognize an unsubmitted state together with the object corresponding to the unsubmitted assignment, based on the obtained assignment submission information.

7. The image processing apparatus according to claim 5, wherein the displaying unit displays the object corresponding to the unsubmitted assignment without displaying the object corresponding to the submitted assignment.

8. The image processing apparatus according to claim 3, further comprising a requesting unit configured to make a request for authentication of a user,
wherein the obtaining unit obtains assignment information corresponding to the user authenticated based on the request made by the requesting unit.

9. The image processing apparatus according to claim 1, further comprising a printing unit,
wherein assignment data for printing an assignment selected by a user is received from the second server, and the printing unit prints the assignment based on the assignment data.

10. A method of controlling an image processing apparatus, the method comprising:
reading an original document;
specifying an assignment;
receiving, from a first server, storage location information indicating a storage location in a second server corresponding to the specified assignment;
transmitting image data generated by reading of the original document to the storage location indicated based on the received storage location information; and
notifying the first server of identification information for identifying the image data.

11. The method according to claim 10, wherein the identification information for identifying the image data is received from the second server, and the received identification information is notified to the first server.

12. The method according to claim 10, further comprising obtaining assignment information,
wherein the assignment is specified based on the obtained assignment information.

13. The method according to claim 12, further comprising displaying objects for respective assignments based on the obtained assignment information,
wherein an assignment is specified by selecting an object from among the objects for the respective assignments.

14. The method according to claim 13,
wherein assignment submission information indicating whether an assignment is submitted or not is further obtained, and
wherein an object corresponding to a submitted assignment and an object corresponding to an unsubmitted assignment are displayed based on the obtained assignment submission information.

15. The method according to claim 14, wherein information enabling a user to recognize an unsubmitted state is displayed together with the object corresponding to the unsubmitted assignment, based on the obtained assignment submission information.

16. The method according to claim 14, wherein the object corresponding to the unsubmitted assignment is displayed without displaying the object corresponding to the submitted assignment.

17. The method according to claim 12, further comprising making a request for authentication of a user,
wherein assignment information corresponding to the user authenticated based on the request is obtained as the assignment information.

18. The method according to claim 10, further comprising printing an assignment selected by a user based on assignment data for printing the selected assignment received from the second server.

19. A non-transitory computer readable storage medium for causing a computer to execute a method of controlling an image processing apparatus comprising a reading unit configured to read an original document, the method comprising:

specifying an assignment;

receiving, from a first server, storage location information indicating a storage location in a second server corresponding to the specified assignment;

transmitting image data generated by reading the original document by the reading unit to the storage location indicated based on the received storage location information; and notifying the first server of identification information for identifying the image data.

* * * * *